Aug. 27, 1957　　　H. S. RAINBOW　　　2,803,943
MEANS FOR SUPPORTING AND DRIVING ACCESSORIES WHICH
ARE EXTERIOR TO A DUCTED-FAN
TURBO-JET ENGINE
Filed Dec. 7, 1954　　　　　　　　　　　　2 Sheets-Sheet 1

United States Patent Office 2,803,943
Patented Aug. 27, 1957

2,803,943

MEANS FOR SUPPORTING AND DRIVING ACCESSORIES WHICH ARE EXTERIOR TO A DUCTED-FAN TURBO-JET ENGINE

Horace Sinclair Rainbow, Coventry, England, assignor to Armstrong Siddeley Motors Limited, Coventry, England Application December 7, 1954, Serial No. 473,517

Claims priority, application Great Britain December 30, 1953

5 Claims. (Cl. 60—35.6)

This invention relates to a turbo-jet engine of the kind in which part of the air compressed by the engine is passed along an annular by-pass duct, surrounding a portion of the engine, to increase the thrust of the engine, while another part is subjected to further compression in the engine.

The main object of the invention is to provide an improved means of supporting and driving the engine accessories.

According to the invention, the engine accessories are grouped on a gear box which is detachably mounted on aerofoil spokes extending through the adjacent portion of the annular by-pass duct, the accessories being driven from the appropriate part of the engine by means of a radially-extending shaft passing within one of the spokes.

Figure 1:
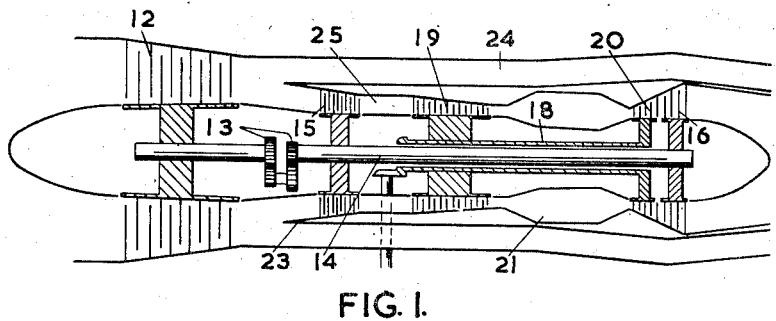
Figure 1 shows diagrammatically a ducted-fan, compound, turbo-jet engine to which the invention is later described as being applied.

Referring to Figure 1, 12 represents a multi-stage axial-flow fan driven through reduction gearing 13 from a shaft 14. The shaft 14 carries the rotor of the low-pressure compressor section 15, and, at its far end, the rotor of the low-pressure turbine section 16. A shaft 18 interconnects the high-pressure compressor section 19 and the high-pressure turbine section 20, the compressor section 19 feeding, in a well understood manner, compressed air to a combustion chamber system 21, in which fuel is added and which delivers to the high-pressure turbine section 20.

The delivery from the fan 12 is divided by an annulus 23 so that one part of the air compressed by the fan is delivered along an annular by-pass duct 24, surrounding the whole of the compound engine, to increase the thrust thereof, while another part is delivered to the upstream end of the low-pressure compressor section 15, whence it travels along an annular duct 25 interconnecting the downstream end of the low-pressure compressor section and the upstream end of the high-pressure compressor section.

Figure 3:
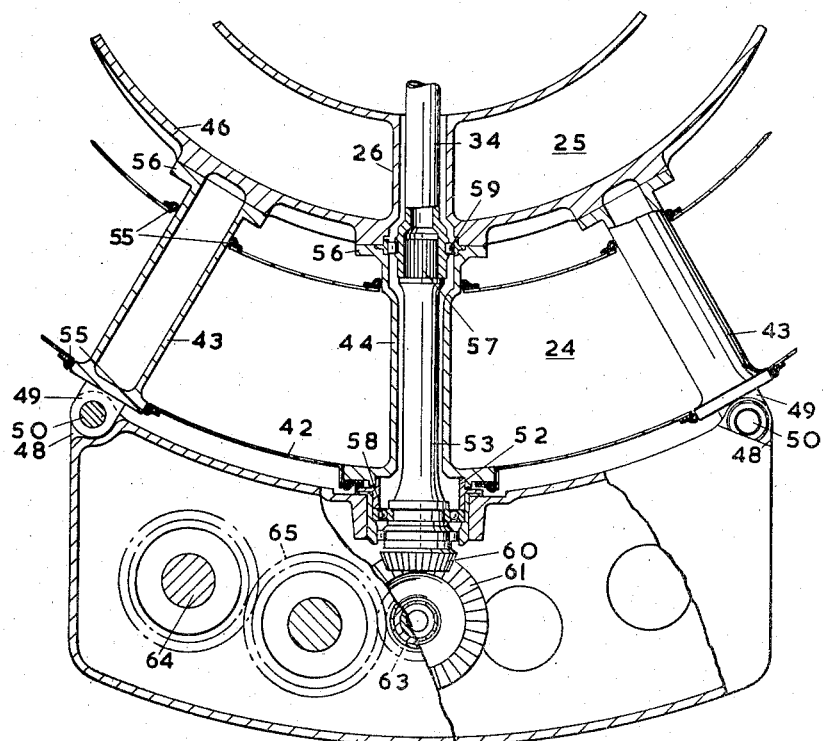
Figure 3 is a fragmentary axial section, taken on the line 3—3 of Figure 2, to a somewhat larger scale.
Figure 2:
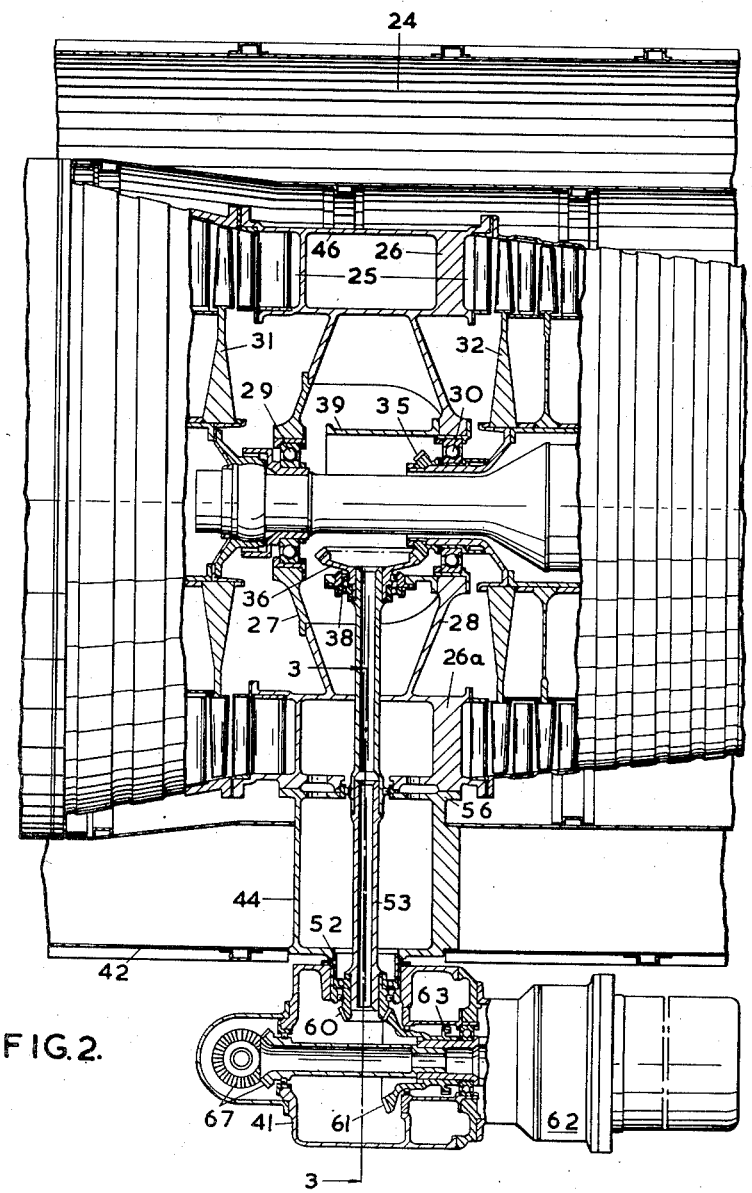
Figure 2 is a sectional elevation showing the gear box and accessory drive.

Referring now to Figures 2 and 3, between the high and low-pressure compressor sections there is a drive casing comprising portions 27, 28 which are supported by a portion of the annular duct 25 the inner and outer walls of which are interconnected by a number of hollow aerofoil-section spokes 26. This drive casing carries thrust bearings 29, 30 for the low-pressure and high-pressure compressor rotors which are respectively marked 31 and 32. It also encloses a drive shaft 34 which extends radially through one of the spokes 26a and is driven through bevel gears 35, 36 from the high-pressure compressor rotor. Bearings 38, for the radially-inner end of the drive shaft 34, are carried by a cylindrical sleeve 39 fast with the casing portion 28.

The gear box 41 for the engine accessories is of part-annular shape and arranged against the periphery of the outer shell 42 of the annular by-pass duct 24, being supported by means of three aerofoil-section spokes 43, 43 and 44. The spokes are attached to the outer wall 46 of the annular duct 25 connecting the low- and high-pressure compressors. The spokes also pass through the by-pass duct 24.

In a preferred arrangement, as shown by Figure 3, the gear box and the outside spokes 43 are formed respectively with interengaging lugs 48, 49 having coaxial holes to receive mounting bolts 50. The intermediate spoke 44 forms a continuation of the spoke 26a through which the drive shaft 34 extends. It also has a locating spigotal connection 52 with the gear box, a continuation 53 of the drive shaft 34 passing along the interior of the intermediate spoke.

It will be observed from Figure 3 that the by-pass duct 24 has seals 55 coacting with the spokes where they pass through it. Also, that the three spokes are flanged at 56 for mounting purposes.

As will be well understood, the gear box 41 may carry such engine accessories as the fuel pump, the starter motor, pressure and scavenge oil pumps, and the tachometer drive. It may, in addition, provide a drive for aircraft accessories.

In the construction illustrated, the continuation shaft 53 is splined at 57 to the drive shaft 34 and is journalled in the gear box 41 at 58 at its radially-outer end, whilst an intermediate steady bearing 59 is provided as shown in Figure 3. The gear box houses a bevel gear 60 on the continuation shaft 53 driving a bevel gear 61 for a starter motor 62. The bevel gear 61 is also formed with a pinion 63 which drives a shaft 64 through gearing including an idler gear 65. An equivalent shaft at the right-hand end (Figure 3) of the gear box, which is not shown in Figure 3, is driven in a similar manner. One of these shafts drives the fuel pump, while the other shaft drives a scavenge and oil pump.

Figure 2 also shows the bevel gear 61 as driving, through a right-angled gear pair 67, a shaft for the tachometer drive.

What I claim as my invention and desire to secure by Letters Patent of the United States is:

1. A turbo-jet engine including casing means providing an annular by-pass duct around a portion of the engine, a gear box disposed outside the by-pass duct, said gear box being detachably mounted on aerofoil spokes extending through the by-pass duct, a radially-extending shaft passing within one of the spokes, said shaft driven from the engine and extending into the gear box, and gearing within the gear box by means of which selected engine accessories are driven.

2. A turbo-jet engine including coaxial internal and external casings providing an annular by-pass duct around a portion of the engine, an accessory-driving gear box of part-annular shape disposed outside the external casing against the periphery thereof, said gear box being detachably mounted on three aerofoil spokes extending through the by-pass duct, and a radially-extending shaft passing within the intermediate spoke, said shaft driven from the engine and extending into the gear box.

3. A turbo-jet engine, according to claim 2, characterized in that the gear box and the outside spokes are formed outside said external casing with lugs, said lugs having holes to receive mounting bolts.

4. A turbo-jet engine, according to claim 2, in which said intermediate spoke has a locating spigotal connection with the gear box, said drive shaft being journalled in bearings at the ends of said intermediate spoke.

5. A turbo-jet engine, according to claim 2, in which said spokes are flanged at their inner ends, radially within said internal casing, for mounting purposes.

References Cited in the file of this patent

UNITED STATES PATENTS

| | | |
|---|---|---|
| 2,548,858 | Benedict | Apr. 17, 1951 |
| 2,671,315 | Rocheville | Mar. 9, 1954 |

FOREIGN PATENTS

| | | |
|---|---|---|
| 703,645 | Great Britain | Feb. 10, 1954 |